US011600061B1

(12) United States Patent
Jeong (10) Patent No.: US 11,600,061 B1
(45) Date of Patent: Mar. 7, 2023

(54) METHOD AND SYSTEM FOR MAINTAINING BRIDGE USING BRIDGE IMAGE DATA

(71) Applicant: Rainbowtech Co., Ltd., Seongnam-si (KR)

(72) Inventor: Han Kyu Jeong, Seongnam-si (KR)

(73) Assignee: Rainbowtech Co., Ltd., Seongnam-si (KR)

(*) Notice: Subject to any disclaimer, the term of this patent is extended or adjusted under 35 U.S.C. 154(b) by 0 days.

(21) Appl. No.: 17/896,629

(22) Filed: Aug. 26, 2022

(30) Foreign Application Priority Data

Oct. 18, 2021 (KR) .................. 10-2021-0138295

(51) Int. Cl.
*G06V 20/17* (2022.01)
*G06V 10/764* (2022.01)
*G06V 20/10* (2022.01)

(52) U.S. Cl.
CPC ............ *G06V 20/17* (2022.01); *G06V 10/764* (2022.01); *G06V 20/176* (2022.01)

(58) Field of Classification Search
CPC ...................................................... G06V 20/17
See application file for complete search history.

(56) References Cited

U.S. PATENT DOCUMENTS

| 10,372,133 | B2* | 8/2019 | Tanaka ................ G06V 20/176 |
| 2017/0193297 | A1* | 7/2017 | Michini ......... G06Q 10/063114 |
| 2022/0274703 | A1* | 9/2022 | Di Cosola .............. G06V 20/17 |

FOREIGN PATENT DOCUMENTS

| KR | 10-1914614 B | 11/2018 |
| KR | 10-2020-0054733 A1 | 5/2020 |
| KR | 10-2237096 B | 4/2021 |
| KR | 10-2299586 B1 | 9/2021 |

OTHER PUBLICATIONS

An Office Action mailed by Korean Intellectual Property Office dated Jan. 14, 2022, which corresponds to Korean Patent Application No. 10-2021-0138295; with English language translation.

* cited by examiner

*Primary Examiner* — Ross Varndell
(74) *Attorney, Agent, or Firm* — Studebaker & Brackett PC

(57) ABSTRACT

Provided are a method and a system for analyzing image data obtained by photographing a bridge by a drone using artificial intelligence, rapidly and accurately finding a part that requires maintenance of the bridge, and calculating a maintenance solution and a maintenance estimate for the part. The system for maintaining a bridge by analyzing bridge image data received from a drone using artificial intelligence, includes: the drone that photographs the bridge to generate the bridge image data; and an artificial intelligence bridge maintenance apparatus that finds a part of the bridge requiring maintenance, and calculates an optimal maintenance solution and an optimal maintenance estimate necessary for the bridge maintenance.

11 Claims, 6 Drawing Sheets

| DIVISION | ENVIRONMENT | DURABILITY | | | WATERPROOFING (UNIT: mm) |
|---|---|---|---|---|---|
| | OTHER CAUSE | SEVERE ENVIRONMENT | MEDIUM ENVIRONMENT | ORDINARY ENVIRONMENT | |
| WIDTH OF CRACK REQUIRING MAINTENANCE | LARGE | 0.4 OR MORE | 0.4 OR MORE | 0.6 OR MORE | 0.2 OR MORE |
| | MEDIUM | 0.4 OR MORE | 0.6 OR MORE | 0.8 OR MORE | 0.2 OR MORE |
| | SMALL | 0.6 OR MORE | 0.8 OR MORE | 1.0 OR MORE | 0.2 OR MORE |
| WIDTH OF CRACK NOT REQUIRING MAINTENANCE | LARGE | 0.1 OR LESS | 0.2 OR LESS | 0.2 OR LESS | 0.05 OR LESS |
| | MEDIUM | 0.1 OR LESS | 0.2 OR LESS | 0.3 OR LESS | 0.05 OR LESS |
| | SMALL | 0.2 OR LESS | 0.3 OR LESS | 0.3 OR LESS | 0.05 OR LESS |

FIG 6

| CONDITIONS | ALLOWABLE MAXIMUM CRACK WIDTH (mm) |
|---|---|
| DRY AIR LAYER OR PROTECTING/CURING LAYER | 0.4 |
| INSIDE HUMID AIR, INSIDE SOIL | 0.3 |
| CONTACT WITH CRYOPROTECTANT | 0.175 |
| REPEATED DRY AND WET CONDITIONS CAUSED BY SEAWATER AND SEA WIND | 0.15 |
| WATERTIGHT STRUCTURAL MEMBER | 0.1 |

METHOD AND SYSTEM FOR MAINTAINING BRIDGE USING BRIDGE IMAGE DATA

CROSS-REFERENCE TO RELATED APPLICATION

A claim for priority under 35 U.S.C. § 119 is made to Korean Patent Application No. 10-2021-0138295 filed on Oct. 18, 2021 in the Korean Intellectual Property Office, the entire contents of which are hereby incorporated by reference.

BACKGROUND

Technical Field

The present invention relates to a method and a system for maintaining a bridge using bridge image data, and more particularly to, a method and a system for analyzing image data obtained by photographing a bridge by a drone using artificial intelligence, finding a part that requires maintenance of the bridge in a short time, and calculating a maintenance solution and a maintenance estimate for the part.

Related Art

[National R&D project for the present invention]
[Project number] D2121026
[Department] Gyeonggi-do
[Research Management Institution] Gyeonggi-do Business & Science Accelerator
[Project name] Gyeonggi-do technology development project
[Research title] Development of deep learning AI system for building exterior diagnosis that automatically recommends crack repair and painting construction methods through drone photographing
[Contribution rate] 100/100
[Organizer] Rainbowtech Co., Ltd.
[Research Period] 2021 Aug. 1~2022 Jul. 31

A lot of buildings constructed in the era of industrialization have become old and aged as a lot of time has passed, and accordingly, the need for maintenance of the buildings has increased.

A safety inspection for maintenance of such old buildings has been mainly performed by visually checking cracks on an external appearance of the buildings by humans, but there are many dangerous factors such as fall death during the maintenance of the buildings.

Further, an inspection result of maintenance may vary depending on a skill level of an operator or inspector. Accordingly, there is an increasing demand for a standard inspection method, a cost estimation method, and a system thereof for making an accurate inspection in the maintenance inspection related to the external appearance of the buildings.

PRIOR ART LITERATURE

[Patent document]
Korea Patent No. 10-1914614 (2018 Nov. 2)
Korea Patent No. 10-2237096 (2021 Apr. 8)

SUMMARY

An object of the present invention is to provide a method and a system for analyzing image data obtained by photographing a bridge by a drone using artificial intelligence, rapidly and accurately finding a part that requires maintenance of the bridge, and calculating a maintenance solution and a maintenance estimate for the part.

According to an aspect of the present invention, there is provided a system for maintaining a bridge by analyzing bridge image data received from a drone using artificial intelligence, including: the drone that photographs a bridge to generate the bridge image data; and an artificial intelligence bridge maintenance apparatus that finds a part of the bridge requiring maintenance, and calculates an optimal maintenance solution and an optimal maintenance estimate necessary for the bridge maintenance.

Here, the artificial intelligence bridge maintenance apparatus may include: a communicating unit that communicates with the drone to receive the bridge image data and transmits a drone control signal; a DB that stores bridge data and the bridge image data; a primary bridge image data generating unit that controls the drone under the control of an artificial intelligence processing unit to perform drone photographing to generate primary bridge image data for a concerned area of the bridge; and the artificial intelligence processing unit that analyzes the bridge data and the bridge image data through big data and artificial intelligence to divide the bridge into drone photographing areas, analyzes the primary bridge image data to select a dangerous part that requires intensive photographing for the bridge maintenance, performs precise drone photographing for the dangerous part to generate secondary bridge image data including corrected features for cracks, and analyzes the secondary bridge image data to calculate a maintenance solution and a maintenance estimate for the bridge.

Here, the artificial intelligence processing unit may include: a drone photographing area dividing unit that determines structural features of the bridge using at least one of the bridge data and the bridge image data to divide the bridge into the drone photographing areas according to priority; a dangerous part selecting unit that analyzes the primary bridge image data through a dangerous part selecting artificial intelligence method to select the dangerous part that requires the intensive photographing for the bridge maintenance; a secondary bridge image data generating unit that performs the precise drone photographing for the dangerous part through a precise crack photographing artificial intelligence method to generate the secondary bridge image data including the corrected features for the cracks; and a maintenance solution and estimate calculating unit that analyzes the secondary bridge image data using a bridge maintenance artificial intelligence method to calculate the maintenance solution and the maintenance estimate for the dangerous part.

Here, the system may include a raw material information processing unit. The raw material information processing unit controls the communicating unit to communicate with each supplier server with respect to raw material information, periodically receives the raw material information through the Internet, updates and stores the received raw material information in the DB, and searches for the raw material information when necessary, and the maintenance solution and estimate calculating unit calculates a bridge maintenance solution and a maintenance estimate for maximizing a maintenance effect using the raw material information acquired from the raw material information processing unit.

Here, the drone photographing area dividing unit may set a maintenance importance in consideration of a bridge type, a bridge construction method, bridge design drawings, and natural environments in which the bridge is located, and divide the bridge into the drone photographing areas according to the maintenance importance.

Here, the dangerous part selecting unit may analyze at least one of a photographing route of the drone and photographing information included in the primary bridge image data stored in the DB, perform drone photographing to match the photographing route of the drone, perform correction to be the same or similar to the photographing information to generate the primary bridge image data, and select a part of the bridge in which a change of at least one of the shape, color, and features of cracks in the primary bridge image data is equal to or greater than a reference range as a dangerous part, using a CNN (Convolution Neural Network) method for optimally changing a filter and a channel according to features to be compared between the generated primary bridge image data and the existing bridge image data.

According to another aspect of the present invention, there is provided a bridge maintaining method using bridge image data in a bridge maintaining system including a drone and an artificial intelligence bridge maintenance apparatus, the method including: (a) a step of dividing a bridge into drone photographing areas using at least one of bridge data stored in a DB and existing bridge image data, by the artificial intelligence bridge maintenance apparatus; (b) a step of performing drone photographing for the photographing areas of the drone according to priority, generating primary bridge image data for a concerned area including a photographing route of the drone and photographing information, and storing the generated primary bridge image data in the DB to update the existing bridge image data, by the artificial intelligence bridge maintenance apparatus; (c) a step of analyzing the primary bridge image data using a dangerous part selecting artificial intelligence method to select a dangerous part that needs intensive photographing for bridge maintenance, by the artificial intelligence bridge maintenance apparatus; (d) a step of performing precise drone photographing for the dangerous part using a precise crack photographing artificial intelligence method, generating secondary bridge image data including corrected features for cracks, and storing the generated secondary bridge image data in the DB, by the artificial intelligence bridge maintenance apparatus; and (e) a step of analyzing the secondary bridge image data using a bridge maintenance artificial intelligence method to calculate a maintenance solution and a maintenance estimate for the bridge, by the artificial intelligence bridge maintenance apparatus.

Here, the step (a) may include a step of setting a maintenance importance in consideration of the bridge data and natural environment conditions in which the bridge is built, and dividing the bridge into the drone photographing areas according to the maintenance importance.

Here, the photographing route of the drone may include at least one of position information according to movement of the drone that generates the primary bridge image data, information on position changes of the drone by lapse of time, and speed information of the drone. The photographing information may include at least one of information on a time, a date, a wind speed, a weather when the primary bridge image data is generated, and information on a distance between the drone and a concerned part of the bridge when the primary bridge image data is generated. The dangerous part selecting artificial intelligence method may analyze at least one of the photographing route of the drone and the photographing information included in the primary bridge image data stored in the DB, perform drone photographing to match the photographing route of the drone, perform correction to be the same or similar to the photographing information to generate the primary bridge image data, and select a part of the bridge in which a change of at least one of the shape, color, and features of cracks in the primary bridge image data is equal to or greater than a reference range as a dangerous part, using a CNN (Convolution Neural Network) method for optimally changing a filter and a channel according to features to be compared between the generated primary bridge image data and the existing bridge image data.

Here, the precise crack photographing artificial intelligence method may determine the width, length, and depth of a crack by correcting the photographing route, a photographing position, and a photographing distance of the drone.

Here, the bridge maintenance artificial intelligence method may determine an optimal maintenance solution using a bridge design, a construction method, construction materials, and features of cracks of a part where the cracks occur, in the secondary bridge image data, and calculate an optimal maintenance estimate using the same.

Here, the bridge maintenance artificial intelligence method may calculate a bridge maintenance solution and a maintenance estimate for optimizing a cost and a maintenance effect necessary for the bridge maintenance using raw material information necessary for the bridge maintenance, acquired through a raw material information processing unit.

According to the present invention, it is possible to quickly and accurately provide a maintenance solution and a maintenance estimate by analyzing drone image data of a bridge using big data and artificial intelligence.

Further, according to the present invention, by analyzing cracks in the bridge using artificial intelligence to determine priority for maintenance according to parts where cracks occur and features of the cracks, it is possible to efficiently calculate the maintenance solution and the cost of maintenance of the bridge.

DETAILED DESCRIPTION

Advantages and features of the present invention, and methods for achieving them will become apparent with reference to embodiments described below in detail with the accompanying drawings.

The present invention is not limited to the embodiments disclosed below, but can be implemented in various different forms.

In the present specification, the embodiments are provided to complete the disclosure of the present invention, and to completely inform those skilled in the art to which the present invention belongs of the scope of the invention.

Further, the invention is only defined by the scope of claims.

Accordingly, in some embodiments, well-known components, well-known operations, and well-known techniques will not be specifically described to avoid obscuring the present invention.

Throughout the specification, the same reference numerals refer to the same components, and terms referred to in the specification are used for the purpose of describing the embodiments and are not intended to limit the present invention.

In the specification, the singular also includes the plural unless otherwise stated, and components and operations referred to by 'comprising, including or having' do not exclude the presence or addition of one or more other components and operations.

Unless otherwise defined, all terms (including technical and scientific terms) used herein may be used with meanings commonly understood by those skilled in the art to which the present invention belongs.

Further, terms defined in common dictionaries are not to be interpreted ideally or excessively unless otherwise stated.

Hereinafter, preferred embodiments of the present invention will be described with reference to the accompanying drawings.

Figure 1:
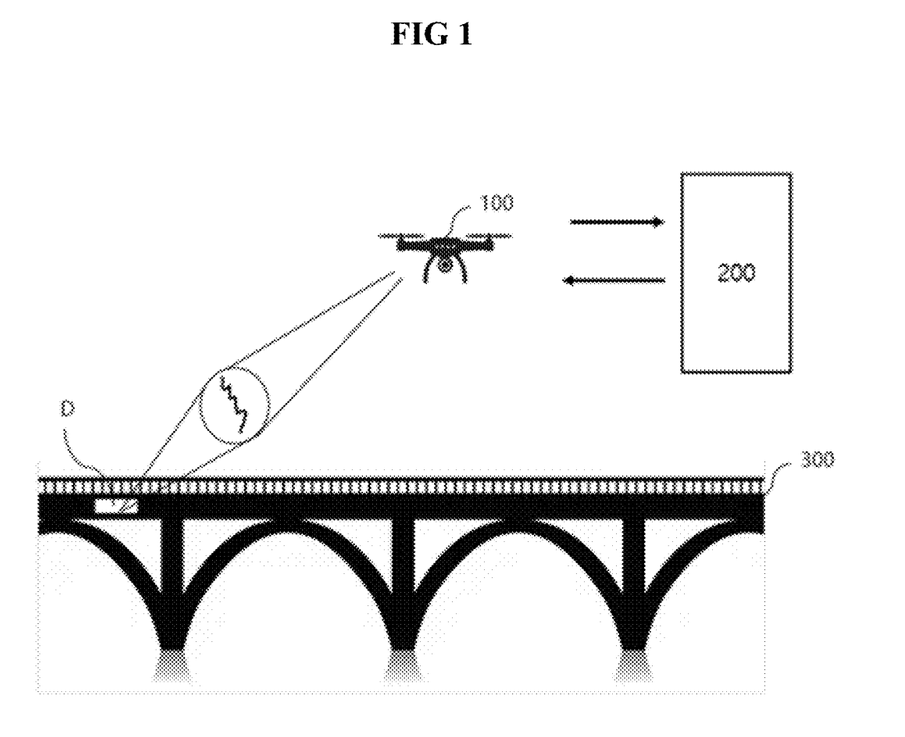
FIG. 1 is a diagram for schematically illustrating an operation of a system that maintains a bridge using bridge image data according to an embodiment of the present invention.

FIG. 1 is a diagram for schematically illustrating an operation of a system that maintains a bridge using bridge image data according to an embodiment of the present invention.

According to the system of the present embodiment, an appearance of a bridge 300 is imaged using a drone 100, the captured image data is analyzed to find a part requiring maintenance of the bridge 300 and a maintenance solution, to thereby quickly calculate an estimate necessary for bridge maintenance.

To this end, the system of the present embodiment includes the drone 100 and an artificial intelligence bridge maintenance apparatus 200.

The drone 100 captures images of the bridge 300 under the control of the artificial intelligence bridge maintenance apparatus 200 to generate bridge image data, and transmits the bridge image data to the artificial intelligence bridge maintenance apparatus 200.

The artificial intelligence bridge maintenance apparatus 200 analyzes the bridge image data received from the drone 100 through big data analysis and artificial intelligence to find a part of the bridge requiring maintenance, and calculates an optimal maintenance solution and an optimal maintenance estimate necessary for the bridge maintenance.

The artificial intelligence bridge maintenance apparatus 200 divides the bridge into a plurality of photographing areas using bridge data and existing bridge image data, and photographs the plurality of photographing areas to create bridge image data on the corresponding areas.

Here, the existing bridge image data refers to primary bridge image data and secondary bridge image data stored in a DB 220. That is, in order to distinguish bridge image data (primary bridge image data and secondary bridge image data) that is newly created through the drone 100 from previous bridge image data (primary bridge image data and secondary bridge image data) stored in the DB 220, the primary bridge image data and the secondary bridge image data stored in the DB 220 will be referred to as the existing bridge image data.

Here, in a case where the bridge image data (the primary bridge image data and the secondary bridge image data) that is currently newly created through the drone 100 is stored in the DB 220, the existing bridge image data is updated.

The artificial intelligence bridge maintenance apparatus 200 may analyze image data on the plurality of photographing areas using artificial intelligence and big data to find a part D hat requires maintenance, and may create precise image data on cracks of the part through artificial intelligence.

Further, the artificial intelligence bridge maintenance apparatus 200 may calculate a maintenance solution and a maintenance estimate for the part D requiring maintenance through artificial intelligence analysis using the precise image data on the cracks.

Figure 2:
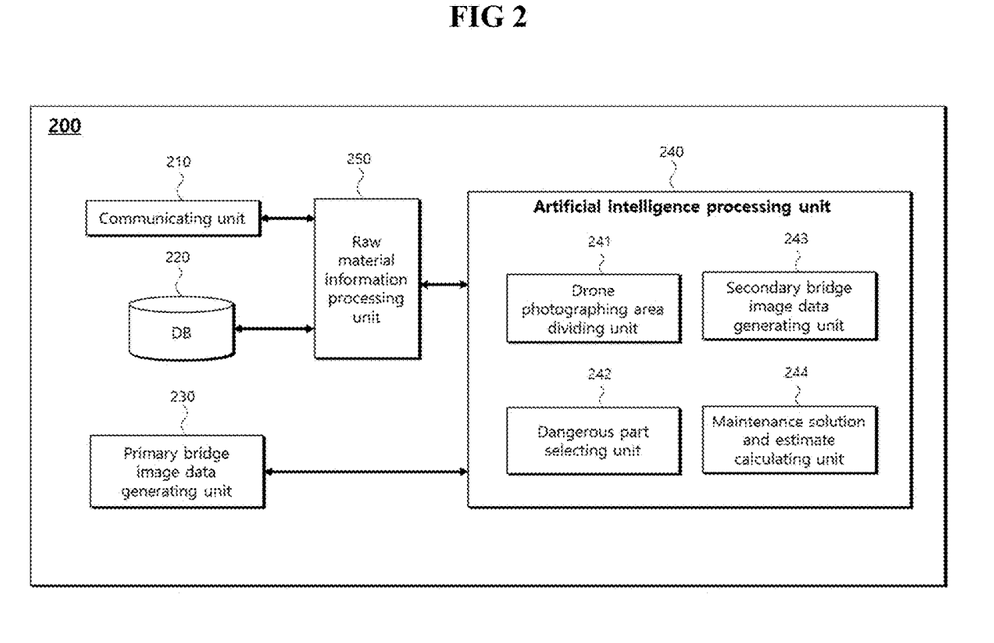
FIG. 2 is a diagram showing a configuration of an artificial intelligence bridge maintenance apparatus according to an embodiment of the present invention.

FIG. 2 is a diagram showing a configuration of an artificial intelligence bridge maintenance apparatus according to an embodiment of the present invention.

The artificial intelligence bridge maintenance apparatus 200 of the present embodiment may include a communicating unit 210, a DB 220, a primary bridge image data generating unit 230, an artificial intelligence processing unit 240, and a raw material information processing unit 250.

The communicating unit 210 performs communication with the drone 100 to receive the bridge image data and transmit a drone control signal.

Further, the communicating unit 210 may communicate with each supplier server to receive information on raw materials necessary for the maintenance of the bridge.

In addition, the communicating unit 210 may access the Internet to receive information on desired raw materials, and may access a server that provides traffic information to receive traffic information on vehicles moving over the bridge.

The DB 220 stores bridge data and bridge image data.

Here, the bridge data includes a bridge type, a bridge construction method, bridge design drawings, natural environments in which the bridge is located, and the like.

The bridge image data refers to the bridge image data (including primary bridge image data and secondary bridge image data) image-captured by the drone 100 for the same bridge.

Here, the primary bridge image data refers to image data on a part of the bridge that is determined to need maintenance, and includes a photographing route and photographing information of the drone when the corresponding data is generated.

The photographing route of the drone refers to route information of the drone for generating the primary bridge image data. For example, the photographing route includes position information (GPS coordinate information) according to movement of the drone that generates the primary bridge image data, information on position changes of the drone by lapse of time, and speed information of the drone.

The photographing information includes information on time, date, wind speed, weather when the primary bridge image data is generated, and information on a distance between the drone and the corresponding part of the bridge when the primary bridge image data is generated.

The reason why the primary bridge image data includes the photographing route and the photographing information when generating the primary bridge image data will be described in detail with reference to FIG. 3.

The secondary bridge image data refers to image data corresponding to a part where a crack of the bridge actually occurs, including corrected image information for the crack.

In addition, the DB 220 may store the received raw material information and the traffic volume information of the bridge.

The primary bridge image data generating unit 230 controls the drone 100 under the control of the artificial intelligence processing unit 240 to perform drone photographing to generate primary bridge image data for the corresponding area.

The artificial intelligence processing unit 240 may analyze the bridge data and the bridge image data through big data and artificial intelligence to divide the bridge into drone photographing areas.

The artificial intelligence processing unit 240 may analyze the primary bridge image data to select a dangerous part that requires intensive photographing for bridge maintenance.

The artificial intelligence processing unit 240 may control the drone 100 to perform precise drone photographing for the dangerous part to generate secondary bridge image data including corrected features for cracks.

The artificial intelligence processing unit 240 may analyze the secondary bridge image data to calculate a maintenance solution and a maintenance estimate for the bridge.

Here, the artificial intelligence processing unit 240 includes a drone photographing area dividing unit 241, a dangerous part selecting unit 242, a secondary bridge image data generating unit 243 and a maintenance solution and estimate calculating unit 244 in order to perform the above-described operation in more detail.

The drone photographing area dividing unit 241 may determine structural features of the bridge using at least one of the bridge data and the bridge image data to divide the bridge into the drone photographing areas according to priority.

The dangerous part selecting unit 242 may analyze the primary bridge image data through a dangerous part selecting artificial intelligence method to select a dangerous part that requires intensive photographing for bridge maintenance.

The secondary bridge image data generating unit 243 may perform precise drone photographing for the dangerous part through a precise crack photographing artificial intelligence method to generate secondary bridge image data including corrected features for cracks.

The maintenance solution and estimate calculating unit 244 may analyze the secondary bridge image data using a bridge maintenance artificial intelligence method to calculate a maintenance solution and a maintenance estimate for the dangerous part.

The raw material information processing unit 250 processes information on raw materials necessary for bridge maintenance.

That is, the raw material information processing unit 250 may control the communicating unit 210 to communicate with each supplier server, request the supplier server of the information on the raw materials necessary for the bridge maintenance, and receive the information from the corresponding supplier.

Further, the raw material information processing unit 250 may search for a new supplier rather than an existing supplier through the Internet for necessary raw material information.

The raw material information processing unit 250 periodically receives the raw material information, updates and stores the information in the DB 220.

Further, in a case where the artificial intelligence processing unit 240 calculates the bridge maintenance estimate using the bridge maintenance artificial intelligence method, the raw material information processing unit 250 may search for necessary optimal raw material information from among the raw material information stored in the DB 220.

Further, in a case where the price of a specific raw material increases abnormally, the raw material information processing unit 250 may search for an alternative raw material and store the result in the DB 220.

The dangerous part selecting artificial intelligence method, the precise crack photographing artificial intelligence method, and the bridge maintenance artificial intelligence method will be described later with reference to FIG. 3.

Figure 3:
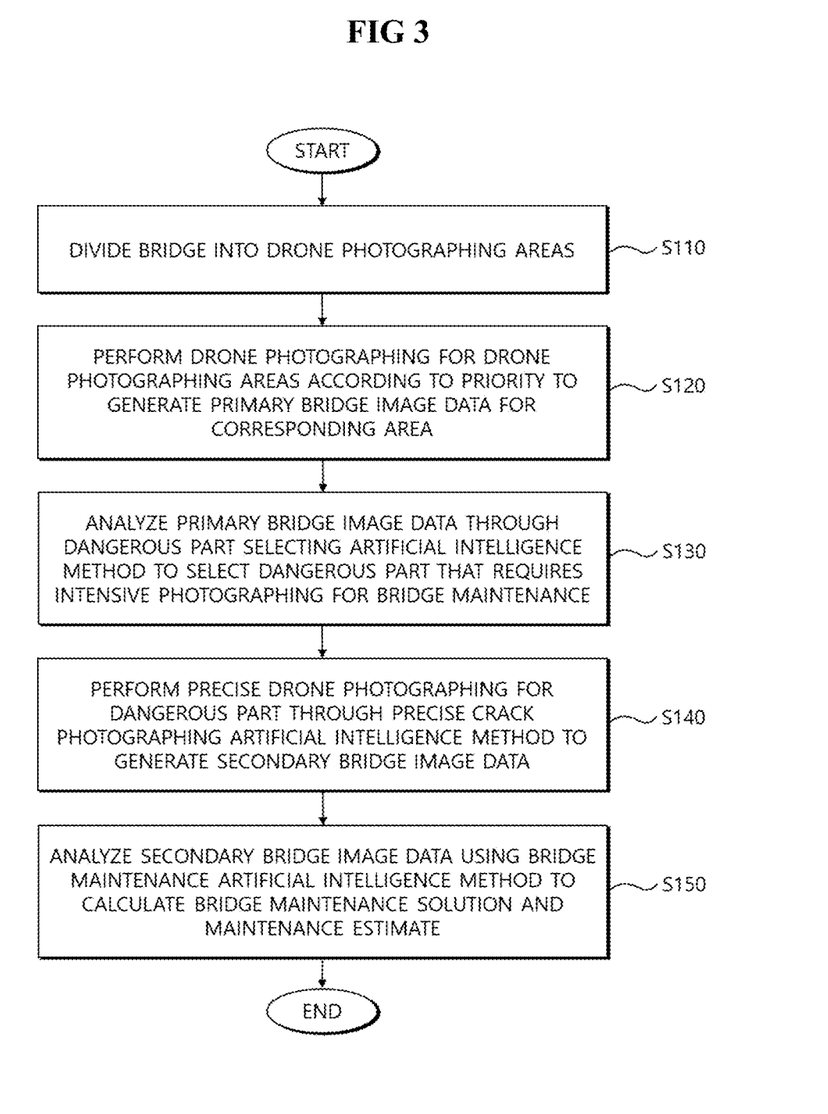
FIG. 3 is a diagram for illustrating a method for calculating a maintenance solution and a maintenance estimate using bridge image data according to an embodiment of the present invention.

FIG. 3 is a diagram for illustrating a method for calculating a maintenance solution and a maintenance estimate using bridge image data according to an embodiment of the present invention.

Step S110 is a step of dividing a bridge into drone photographing areas.

The artificial intelligence bridge maintenance apparatus 200 of the present embodiment may divide the bridge into the drone photographing areas using at least one of the bridge data (bridge type, bridge construction method, bridge design drawings, natural environments in which the bridge is located, and the like) and the existing bridge image data.

Even in a case where the same or similar cracks occur in the bridge, the meaning or importance thereof may differ depending on areas where the cracks occur, due to structural functions of the bridge.

For example, a shear force acts largely at end parts of the bridge, and a tensile force due to a bending moment of a lower floor acts as the greatest burden at a central part thereof. Accordingly, at the end parts and the central part, the check should be focused on behaviors of the parts under the influence of the load.

In the present embodiment, in consideration of the above-mentioned point, the bridge 300 may be divided into a plurality of drone photographing areas using at least one of the bridge data (bridge type, bridge construction method, bridge design drawings, natural environments in which the bridge is located, and the like) and the existing bridge image data.

This will be described in more detail with reference to FIG. 4.

Step S120 is a step of performing drone photographing for the drone photographing areas according to the priority to generate primary bridge image data for the corresponding areas.

After dividing the bridge into the drone photographing areas in step S110, the priority may be given according to the drone photographing areas.

Here, the priority is given in the order of importance of areas for bridge maintenance by analyzing the bridge data.

For example, in a case where the bridge 300 is divided into a top plate and a pillar as the drone photographing areas, the priority is given to the top plate rather than the pillar, so that the top plate is preferentially and precisely imaged by drone photographing.

Here, the primary bridge image data may include a drone photographing route and photographing information in a case where the primary bridge image data is generated.

The reason why the primary bridge image data includes the drone photographing route and the photographing information when generating the primary bridge image data is as follows.

In comparing the existing primary bridge image data with the currently photographed primary bridge image data, by performing drone photographing under the same or similar conditions as in generating the existing primary bridge image data, it is possible to quickly and easily find out a changed part (for example, the number, sizes, directions, or the like of cracks) in the existing primary bridge image data without significantly correcting the currently photographed primary bridge image data. That is, it is possible to quickly find out a changed part in the image data without additionally performing a complicated image operation process.

Step S130 is a step of analyzing the primary bridge image data through a dangerous part selecting artificial intelligence method to select a dangerous part that requires intensive photographing for bridge maintenance.

The dangerous part selecting artificial intelligence method employs a CNN (Convolution Neural Network) method that optimally changes a filter and a channel according to features to be compared between the primary bridge image data and the existing bridge image data (that is, the existing primary bridge image data) to select a part of the bridge 300 in which a change of at least one of the shape, color, and features of cracks in the primary bridge image data is equal to or greater than a reference range compared to the existing bridge image data as a dangerous part.

For example, in a case where the shape, color, and cracks are changed by 20% or more compared to the existing data with reference to the shape, color, and features of cracks of the existing primary bridge image data, it is possible to select the corresponding part as a dangerous part.

The CNN (Convolutional Neural Network) method is used as a representative artificial intelligence method for image analysis.

In a case where artificial intelligence uses CNN to recognize pictures of cats or dogs, for example, an element that needs learning is a filter.

The artificial intelligence composes a weight set capable of properly recognizing features of a picture by continuously correcting the weights while comparing a value concluded by a current filter through scanning with a correct answer.

The artificial intelligence that recognizes the cat pictures will have a filter with features of cats as the learning progresses. Accordingly, filters with features such as pointed ears, straight pupils, and long tails of cats are made and used.

In a case where these filters scan an image of a cat and find a region with the corresponding features, the probability that this image corresponds to a cat is set high.

In consideration of these features, in the present embodiment, an optimal filter may be selected in advance according to a main image of the existing primary bridge image data, and filter correction may be corrected so that an image comparison operation can be performed in a short time using the selected filter.

Further, in a case where color is not very important in comparative analysis of the primary bridge image data (for example, in a case where only the size and shape of a crack are considered), an image comparison operation speed can be properly improved by using only one channel.

The dangerous part selecting artificial intelligence method of the present embodiment analyzes the photographing route of the drone included in the primary bridge image data stored in the DB, and finds out position information of the drone (GPS coordinate information of the drone) according to movement of the drone when generating the existing primary bridge image data, information on position changes of the drone by lapse of time, speed information of the drone, and the like.

Further, the dangerous part selecting artificial intelligence method of the present embodiment analyzes the photographing information included in the primary bridge image data stored in the DB, and finds out information on time, date, wind speed, and weather when generating the existing primary bridge image data, information on the distance between the drone and a concerned point of the bridge when generating the primary bridge image data, and the like.

Then, the dangerous part selecting artificial intelligence method of the present embodiment generates primary bridge image data by controlling the drone according to the same or similar photographing route of the drone.

That is, the drone is controlled to be the same as the route and speed including the existing movement position of the drone to generate the primary bridge image data.

Here, for more accurate comparison and analysis of image data, the dangerous part selecting artificial intelligence method of the present embodiment may additionally correct and generate the primary bridge image data in accordance with the photographing information including the information on time, date, wind speed, and weather when generating the existing primary bridge image data, the information on the distance between the drone and the concerned point of the bridge when generating the primary bridge image data, and the like.

For example, in a case where the time, date, wind speed, and weather when generating the existing primary bridge image data, and the distance between the drone and the concerned point of the bridge when generating the primary bridge image data become different, even if the same object is photographed at the same position, images may be expressed differently due to changes in the position of the sun, seasons and weathers, and distance differences. Accordingly, in the present embodiment, in consideration of the above point, errors due to the time, date, wind speed, weather, and distance differences are corrected so that images can be expressed under the same conditions, so that the photographing is performed to generate the primary bridge image data under the same conditions as in generating the existing primary bridge image data.

Then, using the above-described CNN method, in a case where the change of at least one of the shape, color, and features of cracks in the primary bridge image data is equal to or greater than the reference range compared to the existing bridge image data, it is possible to select the part of the corresponding image data as a dangerous part.

According to these features of the present embodiment, by performing drone photographing under the same or similar drone photographing route conditions as in generating the existing primary bridge image data, it is possible to quickly and easily find out changed parts (the number, sizes, directions, or the like of cracks) in the existing primary bridge image data without significantly correcting the currently photographed primary bridge image data.

Further, by additionally correcting the existing primary bridge image data according to the generated photographing information to generate primary bridge image data, it is possible to accurately compare and analyze the existing primary bridge image data with the primary bridge image data.

Step S140 is a step of performing precise drone photographing for the dangerous part using the precise crack photographing artificial intelligence method to generate secondary bridge image data.

The dangerous part is a part where a damaged part of the bridge is equal to or greater than the reference range compared to the existing bridge inspection, which means a part that preferentially requires maintenance for the safety of the bridge.

Accordingly, the precise drone photographing is additionally performed for the dangerous part to generate second bridge image data including corrected image information for cracks.

The precise crack photographing artificial intelligence method is a method for determining the width, length, and depth of a crack by correcting a photographing route, a photographing position, and a photographing distance of a drone through big data analysis and artificial intelligence analysis.

Since information on cracks identical to or very similar to real cracks is necessary for the dangerous part, the precise crack photographing artificial intelligence method is performed to remove factors that may cause errors during drone photographing.

That is, the existence of actual cracks may not be detected according to the photographing route, the photographing position, and the photographing distance of the drone, and in this case, image information that is different from image information for the actual cracks may be acquired.

Accordingly, in the present embodiment, by removing and correcting the errors that may occur during drone photographing using the precise crack photographing artificial intelligence method, it is possible to generate secondary bridge image data having realistic crack information.

The secondary bridge image data includes corrected image information on cracks, and thus, includes precise features of cracks that are identical to or very similar to actual cracks.

Step S150 is a step of analyzing the secondary bridge image data using the bridge maintenance artificial intelligence method to calculate a maintenance solution and a maintenance estimate for the bridge.

The bridge maintenance artificial intelligence method is a method for determining an optimal maintenance solution using a bridge design, a construction method, construction materials, and features of cracks of a part where the cracks occur, in the secondary bridge image data, and calculating an optimal maintenance estimate using the same.

For example, the bridge maintenance artificial intelligence method may determine whether a crack is a structural crack that occurs in a concerned member by an external force acting on a bridge deck or a surface crack that occurs during construction or use, and then, may determine a maintenance solution and a maintenance estimate in consideration of the depth or size of the crack.

In the present embodiment, by analyzing each piece of secondary bridge image data through big data and artificial intelligence, it is possible to determine a maintenance solution and a maintenance estimate for a concerned part, and then, it is possible to calculate a maintenance estimate for the overall bridge in consideration of parts of the bridge that requires maintenance as a whole.

Here, even in the case of the same type of bridges, maintenance methods may be different between a bridge built on the sea and a bridge built on a river due to a difference in salinity between the sea and the river, and maintenance methods may be different between a bridge built in a place where a wind speed is high and a bridge built in a place where the wind speed is not high.

Accordingly, the bridge maintenance artificial intelligence method of the present embodiment can determine an optimal maintenance solution in consideration of natural environments where the bridge is built.

Further, even in the case of the same type of bridges, maintenance time points and methods may be different between a place with a high traffic volume and a place with a low traffic volume. Accordingly, the bridge maintenance artificial intelligence method of the present embodiment can analyze the traffic volume of the bridge to differently determine the maintenance time point and the maintenance method in further consideration of the traffic volume.

Further, the bridge maintenance artificial intelligence method of the present embodiment may calculate a maintenance estimate using raw material information necessary for bridge maintenance.

In recent years, the price of raw materials has rapidly increased, and the cost of raw materials has become an important factor at the construction site. Accordingly, proper management of raw material procurement and the purchase cost has become an important part of the maintenance cost.

Accordingly, the raw material information processing unit 250 of the artificial intelligence bridge maintenance apparatus 200 of the present embodiment periodically receives the raw material information necessary for the maintenance of the bridge from raw material suppliers, or searches for the raw material information on the market through the Internet to update and store the result in the DB 220.

Then, in a case where the bridge maintenance is necessary, the maintenance artificial intelligence method may search for respective raw material suppliers that supply necessary raw materials so that the maintenance cost is minimized and the maintenance effect is maximized, and may calculate and provide a raw material purchasing method such that the cost of raw materials can be minimized from combination of the respective suppliers.

Further, in a case where the price of a specific raw material abnormally increases, the maintenance artificial intelligence method may search for a substitute raw material for the specific raw material to recommend the substitute raw material for the maintenance.

Figure 4:
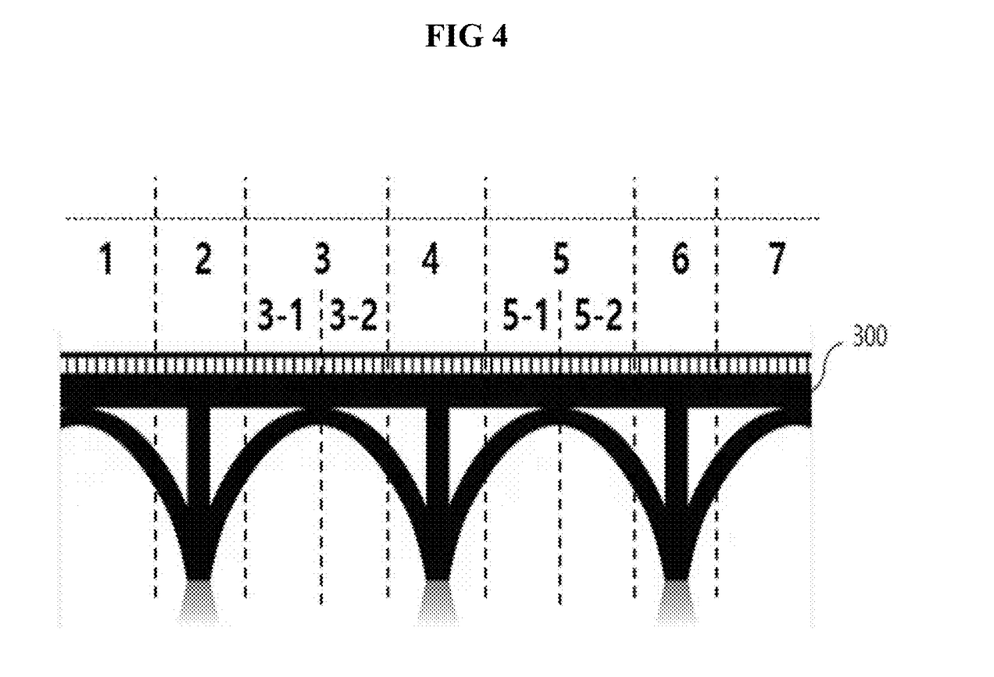
FIG. 4 is a diagram showing division into drone photographing areas of a bridge according to an embodiment of the present invention.

FIG. 4 is a diagram showing division into drone photographing areas of a bridge according to an embodiment of the present invention.

As described above, the artificial intelligence bridge maintenance apparatus 200 of the present embodiment may divide the bridge into the drone photographing areas using at least one of the bridge data (bridge type, bridge construction method, bridge design drawings, natural environments in which the bridge is located, and the like) and the existing bridge image data.

For example, in a case where the bridge is divided into a pillar part, a top plate part, and a ground connection part in consideration of the bridge type, the bridge construction method, and the bridge design drawings, the ground connection part corresponds to parts 1 and 7, and the pillar part corresponds to part 2, 4, and 6, and the top plate part corresponds to parts 3 and 5. According to the present embodiment, with reference to the bridge type, the bridge construction method, and the bridge design drawings, it is possible to divide the bridge into a plurality of drone photographing areas in consideration of a structural shape according to the bridge type, structural features according to the construction method, and natural environments in which the bridge is built.

For example, in consideration of the natural environments in which the bridge is located, when a wind speed at the part 3 shows a large wind speed difference, the part 3 may be divided into a part 3-1 having a high wind speed and a part 3-2 having a slow wind speed. Accordingly, it is possible to divide the bridge into the drone photographing areas in consideration of the wind speed difference. In this case, since the part 3-1, which is the part having the high wind speed, is a part that requires maintenance first, the drone photographing is performed preferentially and precisely.

For example, in consideration of the existing bridge image data, the part 5 may be divided into a part 5-1 that is a part where cracks are severe and a part 5-2 that is a part where cracks are not severe. Accordingly, it is possible to divide the bridge into the drone photographing areas in consideration of the existing bridge image data. In this case, since the part 5-1 is a part that requires maintenance first, the drone photographing is performed preferentially and precisely.

In addition, in the case of a connection part of the bridge, since a bridge girder is connected to a pier by a hinge, and the bridge top plate may be subjected to accumulation of fatigue loads as heavy moving objects (large trucks, or the like) continuously transmit loads, the bridge connection part may be selected as another drone photographing area.

According to the present embodiment of the invention, by dividing the bridge into the drone photographing areas and prioritizing the respective areas using at least one of the bridge data (bridge type, bridge construction method, bridge design drawings, natural environments in which the bridge is located, and the like) and the existing bridge image data, it is possible to perform precise and effective drone photographing for a part that requires maintenance according to the priority.

Figure 5:
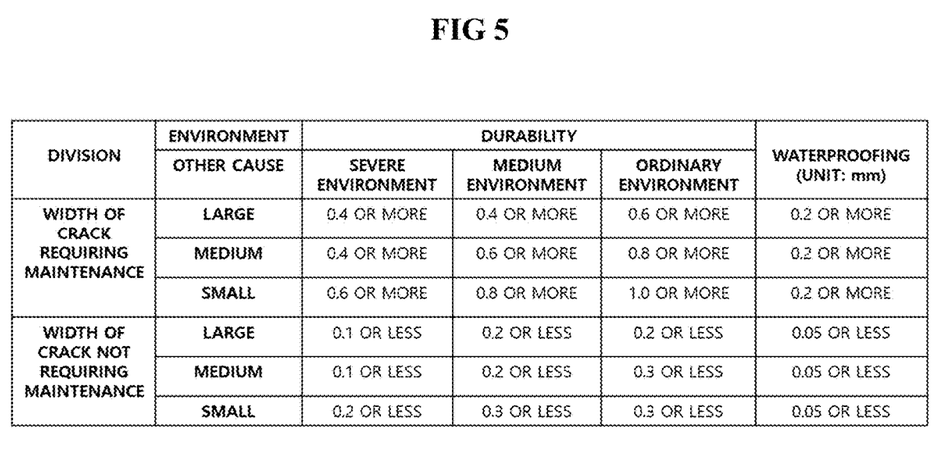
FIG. 5 is a diagram for illustrating a criterion for maintaining a bridge according to features of cracks according to an embodiment of the present invention.

FIG. 5 is a diagram for illustrating a criterion for maintaining a bridge according to features of cracks according to an embodiment of the present invention.

In a case where a crack occurs on a surface of a concrete structure such as a bridge or a tunnel, the size and penetration of the crack are the most important factors for maintenance. For example, since leakage of water of an amount proportional to the cube of the size of the crack occurs, if the crack is left without maintenance, the crack becomes larger due to the leakage.

To solve this problem, according to the present embodiment, by dividing and analyzing a crack that requires maintenance and a crack that does not require maintenance according to environmental factors that affect a concrete structure, it is possible to determine which crack requires maintenance.

Here, the environments mainly refer to environments that affect rust generating conditions of rebar, and the degree of harmfulness that affects durability and waterproofing of the concrete structure may be divided into large, medium, and small, which are decided by combination of effects of the depth and shape of a crack, the presence or absence of surface coating of the concrete structure, a coating thickness, material composition, splicing, and the like.

Figure 6:
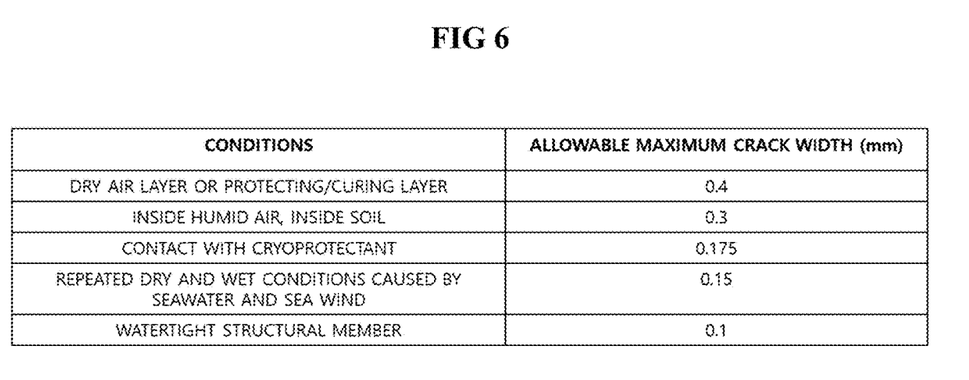
FIG. 6 is a diagram for illustrating a criterion for allowable cracks due to environmental factors according to an embodiment of the present invention.

FIG. 6 is a diagram for illustrating a criterion for allowable cracks due to environmental factors according to an embodiment of the present invention.

In a place where cracks in a concrete structure such as a bridge or tunnel occur, rebar and concrete are separated from each other, and corrosion expands to neighboring areas from an area where the separation occurs, which leads to more severe separation due to rust expansion pressure to further progress the corrosion.

Accordingly, an allowable crack width for durability of a concrete structure may be set as shown in FIG. 6 according to environments that affect the occurrence of rust, as a criterion for maintenance.

The present invention is not limited to the specific preferred embodiments described above, and various modifications will be possible without departing from the essential features of the present invention by those skilled in the art to which the present invention belongs, and it is obvious that variations are within the scope of claims.

EXPLANATION OF REFERENCES

100: Drone
200: Artificial intelligence bridge maintenance apparatus
210: Communicating unit
220: DB
230: Primary bridge image data generating unit
240: Artificial intelligence processing unit
241: Drone photographing area dividing unit
242: Dangerous part selecting unit
243: Secondary bridge image data generating unit
244: Maintenance solution and estimate calculating unit
250: Raw material information processing unit
300: Bridge

What is claimed is:

1. A system for maintaining a bridge by analyzing bridge image data received from a drone using artificial intelligence, comprising:
   the drone that photographs a bridge to generate the bridge image data; and
   an artificial intelligence bridge maintenance apparatus that finds a part of the bridge requiring maintenance, and calculates an optimal maintenance solution and an optimal maintenance estimate necessary for the bridge maintenance,
   wherein the artificial intelligence bridge maintenance apparatus includes:
      a communicating unit that communicates with the drone to receive the bridge image data and transmits a drone control signal;
      a DB that stores bridge data and the bridge image data;
      a primary bridge image data generating unit that controls the drone under the control of an artificial intelligence processing unit to perform drone photographing to generate primary bridge image data for a concerned area of the bridge; and
   the artificial intelligence processing unit that analyzes the bridge data and the bridge image data through big data and artificial intelligence to divide the bridge into drone photographing areas, analyzes the primary bridge image data to select a dangerous part that requires intensive photographing for the bridge maintenance, performs precise drone photographing for the dangerous part to generate secondary bridge image data including corrected features for cracks, and analyzes the secondary bridge image data to calculate a maintenance solution and a maintenance estimate for the bridge,
   wherein the artificial intelligence processing unit includes:
      a drone photographing area dividing unit that determines structural features of the bridge using at least one of the bridge data and the bridge image data to divide the bridge into the drone photographing areas according to priority;

a dangerous part selecting unit that analyzes the primary bridge image data through a dangerous part selecting artificial intelligence method to select the dangerous part that requires the intensive photographing for the bridge maintenance;

a secondary bridge image data generating unit that performs the precise drone photographing for the dangerous part through a precise crack photographing artificial intelligence method to generate the secondary bridge image data including the corrected features for the cracks; and a maintenance solution and estimate calculating unit that analyzes the secondary bridge image data using a bridge maintenance artificial intelligence method to calculate the maintenance solution and the maintenance estimate for the dangerous part, and wherein the dangerous part selecting unit analyzes at least one of a photographing route of the drone and photographing information included in the primary bridge image data stored in the DB, performs drone photographing to match the photographing route of the drone, performs correction to be the same or similar to the photographing information to generate the primary bridge image data, and selects a part of the bridge in which a change of at least one of a shape, color, and features of cracks in the primary bridge image data is equal to or greater than a reference range as a dangerous part, using a CNN (Convolution Neural Network) method for optimally changing a filter and a channel according to features to be compared between the generated primary bridge image data and existing bridge image data.

2. The system according to claim 1, further comprising:
a raw material information processing unit,
wherein the raw material information processing unit controls the communicating unit to communicate with each supplier server with respect to raw material information, periodically receives the raw material information through the Internet, updates and stores the received raw material information in the DB, and searches for the raw material information when necessary, and the maintenance solution and estimate calculating unit calculates a bridge maintenance solution and a maintenance estimate for maximizing a maintenance effect using the raw material information acquired from the raw material information processing unit.

3. The system according to claim 1,
wherein the drone photographing area dividing unit sets a maintenance importance in consideration of a bridge type, a bridge construction method, bridge design drawings, and natural environments in which the bridge is located, and divides the bridge into the drone photographing areas according to the maintenance importance.

4. A bridge maintaining method using bridge image data in a bridge maintaining system including a drone and an artificial intelligence bridge maintenance apparatus, the method comprising:
(a) a step of dividing a bridge into drone photographing areas using at least one of bridge data stored in a DB and existing bridge image data, by the artificial intelligence bridge maintenance apparatus;
(b) a step of performing drone photographing for the photographing areas of the drone according to priority, generating primary bridge image data for a concerned area including a photographing route of the drone and photographing information, and storing the generated primary bridge image data in the DB to update the existing bridge image data, by the artificial intelligence bridge maintenance apparatus;
(c) a step of analyzing the primary bridge image data using a dangerous part selecting artificial intelligence method to select a dangerous part that needs intensive photographing for bridge maintenance, by the artificial intelligence bridge maintenance apparatus;
(d) a step of performing precise drone photographing for the dangerous part using a precise crack photographing artificial intelligence method, generating secondary bridge image data including corrected features for cracks, and storing the generated secondary bridge image data in the DB, by the artificial intelligence bridge maintenance apparatus; and
(e) a step of analyzing the secondary bridge image data using a bridge maintenance artificial intelligence method to calculate a maintenance solution and a maintenance estimate for the bridge, by the artificial intelligence bridge maintenance apparatus,
wherein the precise crack photographing artificial intelligence method determines a width, length, and depth of a crack by correcting the photographing route, a photographing position, and a photographing distance of the drone.

5. The method according to claim 4,
wherein the step (a) includes a step of setting a maintenance importance in consideration of the bridge data and natural environment conditions in which the bridge is built, and dividing the bridge into the drone photographing areas according to the maintenance importance.

6. The method according to claim 4,
wherein the photographing route of the drone includes at least one of position information according to movement of the drone that generates the primary bridge image data, information on position changes of the drone by lapse of time, and speed information of the drone,
the photographing information includes at least one of information on a time, a date, a wind speed, a weather when the primary bridge image data is generated, and information on a distance between the drone and a concerned part of the bridge when the primary bridge image data is generated, and
the dangerous part selecting artificial intelligence method analyzes at least one of the photographing route of the drone and the photographing information included in the primary bridge image data stored in the DB, performs drone photographing to match the photographing route of the drone, performs correction to be the same or similar to the photographing information to generate the primary bridge image data, selects a part of the bridge in which a change of at least one of a shape, color, and features of cracks in the primary bridge image data is equal to or greater than a reference range as a dangerous part, using a CNN (Convolution Neural Network) method for optimally changing a filter and a channel according to features to be compared between the generated primary bridge image data and the existing bridge image data.

7. The method according to claim 4,
wherein the bridge maintenance artificial intelligence method calculates a bridge maintenance solution and a maintenance estimate for optimizing a cost and a maintenance effect necessary for the bridge maintenance using raw material information necessary for the bridge maintenance, acquired through a raw material information processing unit.

8. A bridge maintaining method using bridge image data in a bridge maintaining system including a drone and an artificial intelligence bridge maintenance apparatus, the method comprising:

(a) a step of dividing a bridge into drone photographing areas using at least one of bridge data stored in a DB and existing bridge image data, by the artificial intelligence bridge maintenance apparatus;

(b) a step of performing drone photographing for the photographing areas of the drone according to priority, generating primary bridge image data for a concerned area including a photographing route of the drone and photographing information, and storing the generated primary bridge image data in the DB to update the existing bridge image data, by the artificial intelligence bridge maintenance apparatus;

(c) a step of analyzing the primary bridge image data using a dangerous part selecting artificial intelligence method to select a dangerous part that needs intensive photographing for bridge maintenance, by the artificial intelligence bridge maintenance apparatus;

(d) a step of performing precise drone photographing for the dangerous part using a precise crack photographing artificial intelligence method, generating secondary bridge image data including corrected features for cracks, and storing the generated secondary bridge image data in the DB, by the artificial intelligence bridge maintenance apparatus; and (e) a step of analyzing the secondary bridge image data using a bridge maintenance artificial intelligence method to calculate a maintenance solution and a maintenance estimate for the bridge, by the artificial intelligence bridge maintenance apparatus, wherein the bridge maintenance artificial intelligence method determines an optimal maintenance solution using a bridge design, a construction method, construction materials, and features of cracks of a part where the cracks occur, in the secondary bridge image data, and calculates an optimal maintenance estimate using the same.

9. The method according to claim 8, wherein the step (a) includes a step of setting a maintenance importance in consideration of the bridge data and natural environment conditions in which the bridge is built, and dividing the bridge into the drone photographing areas according to the maintenance importance.

10. The method according to claim 8, wherein the photographing route of the drone includes at least one of position information according to movement of the drone that generates the primary bridge image data, information on position changes of the drone by lapse of time, and speed information of the drone, the photographing information includes at least one of information on a time, a date, a wind speed, a weather when the primary bridge image data is generated, and information on a distance between the drone and a concerned part of the bridge when the primary bridge image data is generated, and the dangerous part selecting artificial intelligence method analyzes at least one of the photographing route of the drone and the photographing information included in the primary bridge image data stored in the DB, performs drone photographing to match the photographing route of the drone, performs correction to be the same or similar to the photographing information to generate the primary bridge image data, selects a part of the bridge in which a change of at least one of a shape, color, and features of cracks in the primary bridge image data is equal to or greater than a reference range as a dangerous part, using a CNN (Convolution Neural Network) method for optimally changing a filter and a channel according to features to be compared between the generated primary bridge image data and the existing bridge image data.

11. The method according to claim 8, wherein the bridge maintenance artificial intelligence method calculates a bridge maintenance solution and a maintenance estimate for optimizing a cost and a maintenance effect necessary for the bridge maintenance using raw material information necessary for the bridge maintenance, acquired through a raw material information processing unit.

\* \* \* \* \*